April 6, 1965 E. I. NASLUND 3,176,827
ARTICLE CONVEYING AND STORAGE SYSTEM
Filed Sept. 20, 1963 5 Sheets-Sheet 5
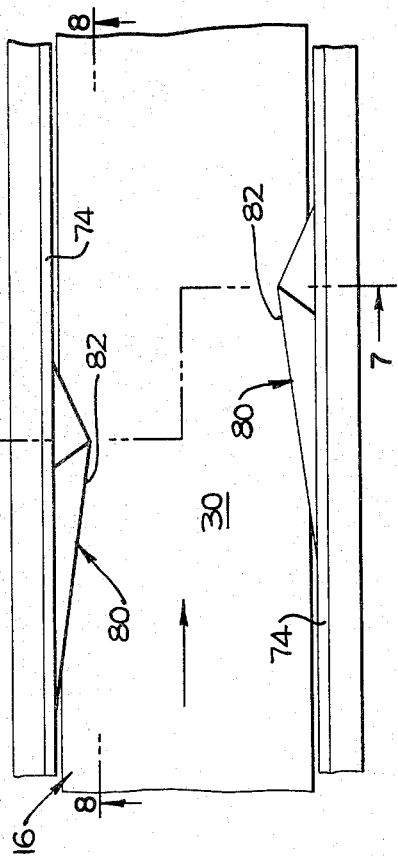
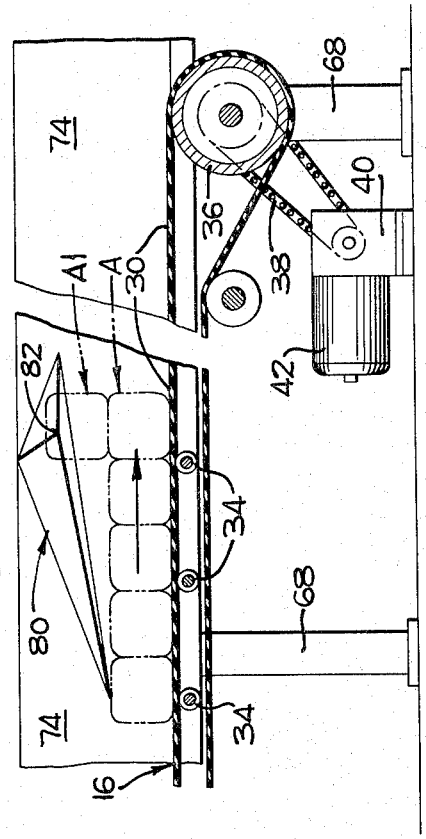
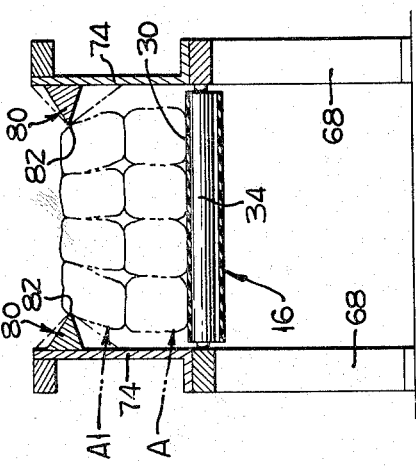
INVENTOR
ERIK I. NASLUND
BY
ATTORNEY United States Patent Office 3,176,827
Patented Apr. 6, 1965

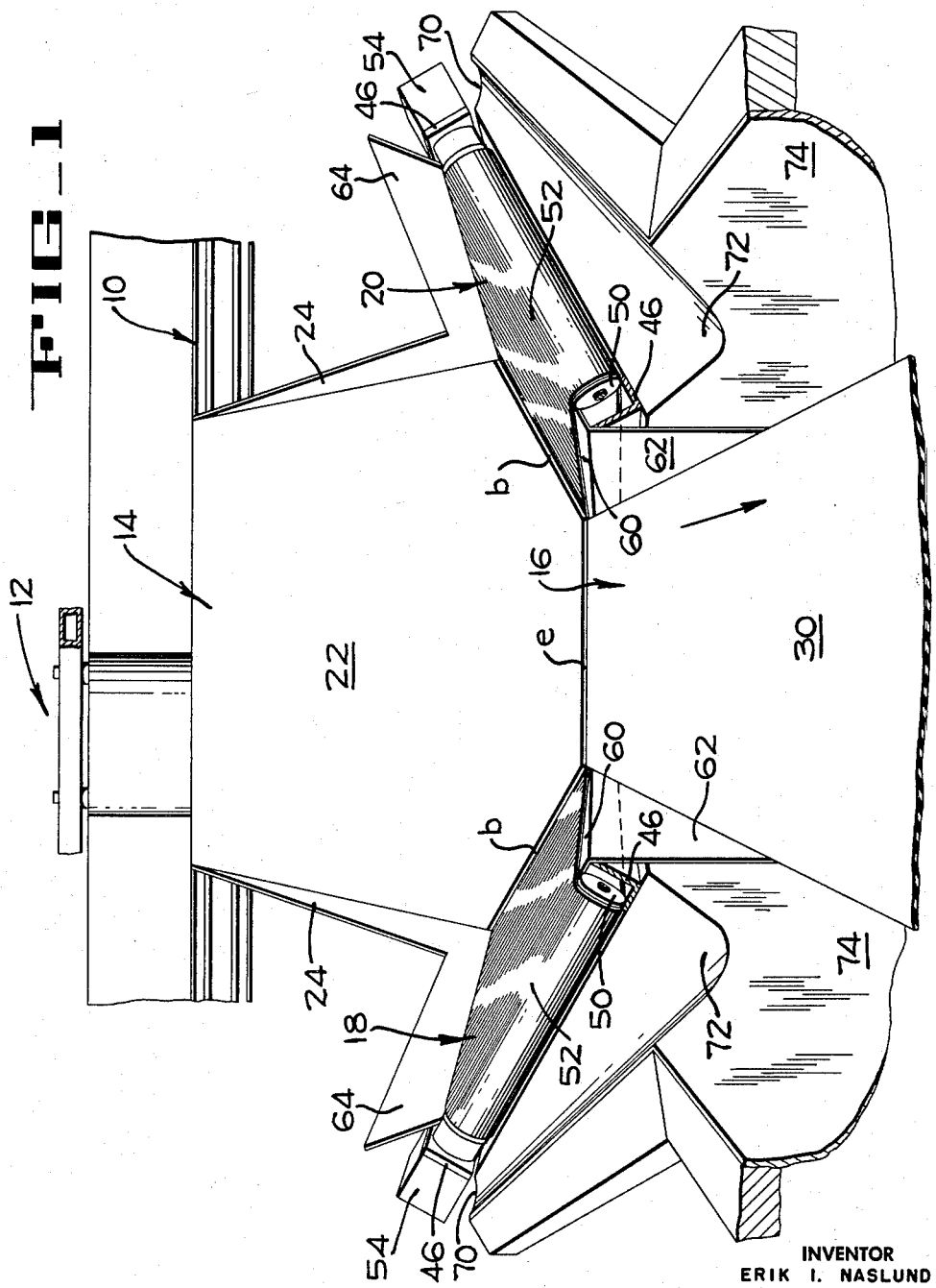

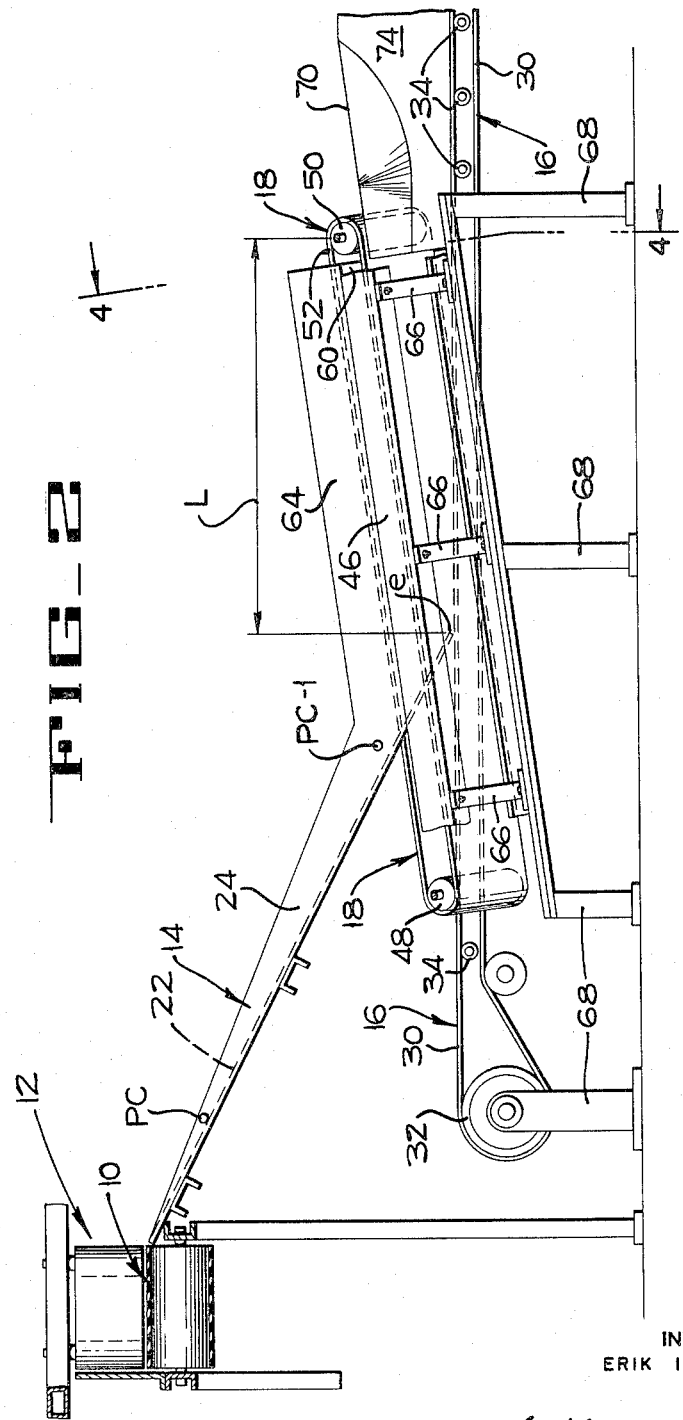

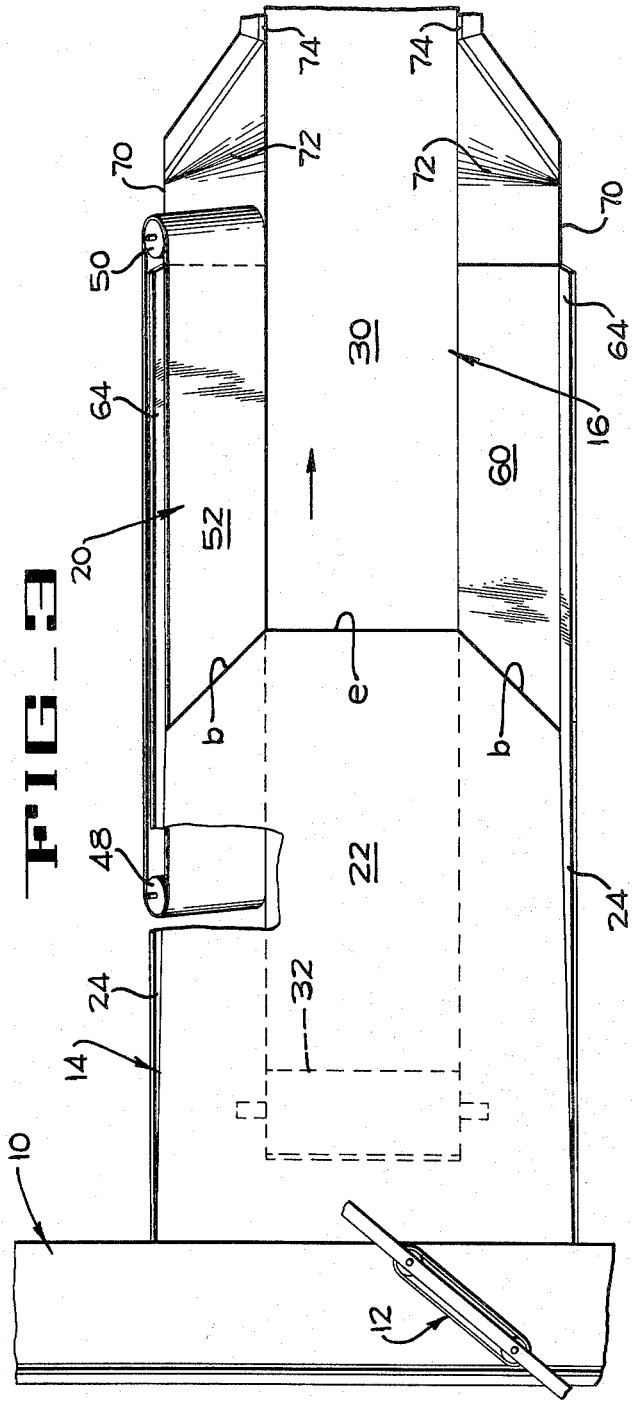

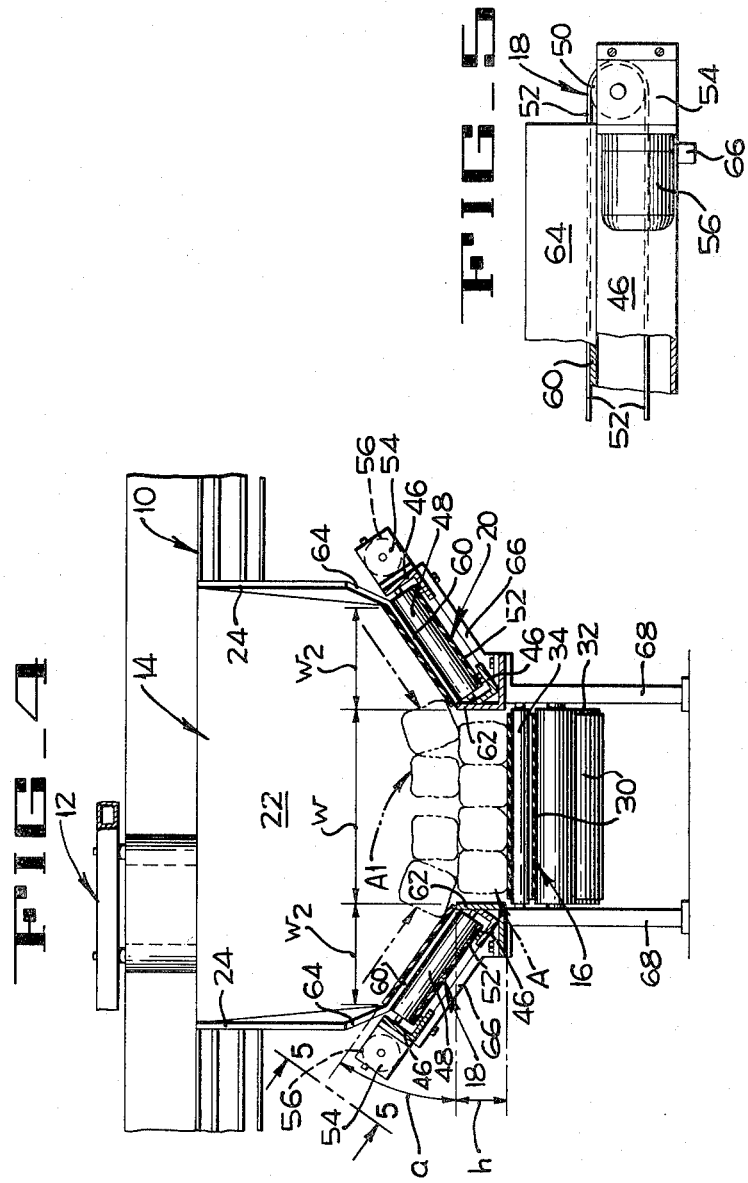

3,176,827
ARTICLE CONVEYING AND STORAGE SYSTEM
Erik I. Naslund, Santa Clara, Calif., assignor to FMC Corporation, San Jose, Calif., a corporation of Delaware
Filed Sept. 20, 1963, Ser. No. 310,363
9 Claims. (Cl. 198—35)

This invention relates to article handling, and more particularly to an article conveying system that may also be used as a storage system. In accordance with the present invention a main conveyor, which may also serve as an intermittently driven storage conveyor, has its utilization factor doubled by a system of stacking conveyors, which are instrumental in developing a second layer of loose articles, such as packages, post office mail sacks, or the like onto a layer of such articles previously deposited on the main conveyor. In large warehouse and post office installations, the main or storage conveyors are often of considerable length, which length may be in the order of several hundred feet. The ability of the present invention to double the utilization factor of such main, or storage conveyors represents a substantial economy in capital equipment costs, in a large warehousing or article handling installation.

It is an object of the present invention to increase the utilization or storage capacity of a conveyor by delivering articles to the conveyor in more than one layer.

Another object of the present invention is to load an endless conveyor with two layers of articles from an inclined delivery slide or chute type conveyor.

A further object of the invention is to provide a multi-layer conveyor system which employs a pair of laterally downwardly inclined stacking conveyors at each side of a main or storage conveyor for loading the main conveyor with two layers of articles.

A further object of the present invention is to laterally reposition the upper layer of articles loaded on a main or storage conveyor as described, so as to avoid interference of the articles with the side walls of the main conveyor and distribute the load across the main conveyors.

A further object of the invention is to insure that articles which have not completely slid laterally from the stacking conveyor onto the main or storage conveyor will be deflected onto the storage conveyor during continued travel of the conveyors.

The manner in which these and other objects of the invention may be obtained will be apparent from the following detailed description of an embodiment of the invention.

In the drawings:

FIGURE 1 is a perspective of a system embodying the invention as it would be installed in a warehouse or article handling system such as a post office, or the like.

FIGURE 2 is a side elevation of the system with parts broken away.

FIGURE 3 is an elevation of the system with parts broken away.

FIGURE 4 is a section taken on lines 4—4 of FIGURE 2.

FIGURE 5 is a fragmentary side elevation showing the driving mechanism for one of the stacking conveyors as seen from lines 5—5 of FIGURE 4.

FIGURE 6 is a fragmentary plan of the main conveyor showing staggered deflectors for the upper layer of articles.

FIGURE 7 is a section taken on lines 7—7 of FIGURE 6.

FIGURE 8 is a fragmentary horizontal section taken on lines 8—8 of FIGURE 6.

The major components of a post office system embodying the present invention appear in FIGURES 1 to 4. The articles are brought in on an endless input conveyor 10 which may serve one or more branching main conveyors. Mounted above the input conveyor 10 is a traveling divertor 12, which in multiple installations can be manipulated to divert articles on the input conveyor 10 to a selected one of the main, or storage conveyors. The input conveyor 10 and the traveling diverter 12 are in themselves units of equipment commonly employed in post offices and other installations, and the specific details of these units are not part of the present invention. Sloping downwardly from one side of the input conveyor 10 is a fixed slide conveyor 14, which delivers articles by gravity to a generally horizontal main, or storage conveyor 16 of the endless type. The conveyor 16 may be of considerable length, and if so, only a short portion thereof appears in the drawings.

A pair of stacking conveyors is provided for each slide and main conveyor namely a left stacking conveyor 18, and a right stacking conveyor 20, as viewed in FIGS. 1 and 4. The stacking conveyors are specially positioned relative to the slide conveyor 14 and the main or storage conveyor 16, as will be described in detail presently. The slide conveyor 14 is formed of sheet metal and has a flat base 22 that extends between the input conveyor 10, and the main and stacking conveyors 16, 18 and 20. The slide conveyor is formed with side flanges 24 to confine the articles as they slide down toward the main conveyor 16. As best seen in FIGURES 1 and 3, the lower end of the slide conveyor 14 terminates in a horizontal end or lip "e" which overlaps the main conveyor 16, and with side lips "b" which are leveled back and which overlap the stacking conveyors 18 and 20.

The storage conveyor 16 is of the conventional heavy duty endless type and details thereof are not critical to the invention. The conveyor includes a flexible belt 30 trained over an idler roller 32 (FIG. 2) and having an upper reach supported by a row of idler support rollers 34, in accordance with conventional construction. As seen in FIGURE 8, the belt 30 of the main conveyor 16 is driven by a drive roller 36, a chain and sprocket assembly 38, a gear reduction unit 40, and an electric motor 42.

The stacking conveyors 18 and 20 are the same, except that one is a left hand and the other a right hand unit. For example, stacking conveyor 20 is supported on angle beams 46 (FIGURES 4 and 5) and includes an idler roller 48 (FIG. 3) at the lower end thereof, and a driving roller 50 at the upper or delivery end thereof. A flexible, endless belt 52 is trained around the rollers 48 and 50, the rollers being mounted in the angle beams 46 previously described. As seen in FIGURE 5, the driving roller 50 of the conveyor is driven by a gear box 54 and an electric motor 56, these drive units having been broken away in FIGURES 2 and 3. The details of the gear boxes 54 form no part of the present invention and so are not illustrated.

In order to support the upper reach of each stacking conveyor, a wing 60 (FIGURES 2 and 4) extends under the upper reach of the belt 52 and is supported on a vertical flange 62 which also forms a partial side flange for the main conveyor 16, as seen in FIGURE 4. The slide flange 24 of the slide conveyor 14 joins with a side flange 64 of each wing 60. The angle beams 46 that mount the rollers of the stacking conveyors 18 and 20 are supported on arms or brackets 66 (FIGURES 2 and 4). The main conveyor 16 and the stacking conveyors 18 and 20 are supported on posts 68.

Means are provided to insure that articles that have run over the delivery ends of the stacking conveyors but do not completely rest on the lower layer of articles on the main conveyor 16 will be deflected completely onto the main conveyor. For this purpose deflector walls or flanges 70, FIGURES 1 and 3, form continuations of the lower reaches of each stacking conveyor. These flanges are curved as at 72 to progressively laterally deflect the forwardly moving articles that may not have completely slid off each stacking conveyor and onto lower level of articles on the main conveyor 16. The deflectors 70 merge with side flanges 74 that run along the sides of the main conveyor 16. The deflectors 70 merge with side flanges 74 that run along the sides of the main conveyor 16.

Means are provided to center the upper layer of articles on the main conveyor 16, down stream of the stacking conveyors 18 and 20. These means are in the form of deflectors 80 appearing in FIGURES 6 to 8. The deflectors extend generally longitudinally on the side flanges 74 that skirt the main conveyor 16. The active part of the deflectors is an upwardly and outwardly inclined edge 82, seen in FIGURES 7 and 8. The deflectors are mounted so as to clear the lower layer of articles on the main conveyor 16.

Typical geometric relations of the parts as illustrated in the drawings of a post office installation are as follows: The main storage conveyor will have a width "$w$" (FIGURE 4) of five feet. The projected width "$w_2$" of each stacking conveyor 18 and 20 will each be two and one-half feet, so that the total width of the slide conveyor 14 will be ten feet. At the delivery end of each stacking conveyor, the upper reach of the stacking conveyor belt is at a height "$h$" above the upper reach of the main conveyor 16, of about two to two and one-half feet. The lateral angle of inclination of each stacking conveyor exceeds the dynamic angle of repose of articles carried by the stacking conveyors. This angle, indicated at "$a$" in FIGURE 4, is approximately 35 degrees to the horizontal. The effective length L of each stacking conveyor (FIG. 2) is approximately 12 feet, this being the length from the lip "$e$" to the delivery end of each stacking conveyor. The length and inclination of the base 22 of the slide conveyor 14 is not critical to the invention, but as illustrated the base 22 is approximately 16 feet long, and makes an angle of approximately 30 degrees with the horizontal.

As to typical conveyor speeds, the main or storage conveyor 16 is driven at 75 feet per minute linear speed, whereas the speed of each stacking conveyor 18, 20 is slightly higher, namely, 80 feet per minute linear speed. This relatively higher speed of the stacking conveyors 18 and 20 relative to the main conveyor 16 results in the stacking conveyors moving relatively to the articles supported thereon in a linear direction. This action occurs because the velocity of the main mass articles is essentially that of the main conveyor 16. Because of this relative motion of the stacking conveyors to the articles that they support, the friction effect between the articles and the stacking conveyor belts is a dynamic friction effect, so that the stacking conveyor inclination angle "$a$" of 35 degrees previously described, insures that substantially all of the articles will slide laterally clear of each stacking conveyor, before they reach the upper or delivery end thereof.

The dynamic friction effect referred to can also be obtained by driving the stacking conveyors at a speed that is somewhat lower than that of the main conveyor. However the higher speed relationship of the stacking conveyors is preferred. In operation, and in the post office type installation illustrated, the main conveyor 16 will operate as a combined transport and storage conveyor. It will be assumed that the slide conveyor 14 is empty and that the main conveyor 16 and that the stacking conveyors 18 and 20 are stationary. Assume now that the sliding diverter 12 deposits a number of articles on the slide conveyor 14. As the articles are delivered to the upper portion of the slide conveyor 14, they interrupt the beam of a photocell unit PC (FIGURE 2) and the motors of the main and stacking conveyors are energized, setting these conveyors in motion. The circuitry of the photocell is not part of the invention, is not claimed, and hence is not illustrated or described. The articles that slide down the central width "$w$" (FIGURE 4) of the slide conveyor 14 slide directly onto the main conveyor 16, and form the lower layer of articles A, as best seen in FIGURE 4. The articles that slide along the slide conveyor and are delivered onto the stacking conveyors over the width "$w_2$" (FIGURE 4) are destined to form the upper layer of articles A1, which rest upon the lower layer A. The articles forming the upper layer A1 are first picked up by the stacking conveyors, and are progressively lifted as they advance with the stacking conveyors. Gravity urges these articles downwardly and laterally inwardly, towards the lower layer of articles A on the main conveyor 16. When the height of the articles of the lower layer is less than a height such as "$h$" (FIG. 4), which represents the spacing of the inner upper edge of each stacking conveyor from the main conveyor, then the articles can slide down onto the upper surfaces of the lower layer A of articles. This action continues, and by the time each stacking conveyor has moved ahead sufficiently to advance articles to the end thereof, substantially all of the leading articles will have been transferred by gravity from the stacking conveyors onto the lower layer A of articles on the main conveyor, as illustrated in phantom in FIGURE 4. Any articles that remain on the stacking conveyors at the delivery thereof, will be deflected by the curved deflectors 70 and will be forced onto the lower layer A of articles on the main conveyor 16. The nature of the deflector 70 and the curved portion thereof is best seen in the perspective of FIGURE 1.

In order to center the upper layer A1 of articles on the lower layer A of articles, the deflectors 80 (FIGURES 6 to 8) come into action. These deflectors are located downstream of the stacking conveyors, and as previously mentioned, any articles that are sliding or scraping along the side walls 74 that skirt the main conveyor 16, and which have not, therefore, been forced laterally inwardly to clear the side walls 74, will engage the edges 82 of the deflectors 80. This will wedge or crowd the articles together into a uniform upper layer A1 of the articles (FIGURE 7). The staggering of the deflectors 80 prevents the jamming of the articles, and in effect jogs the upper layer of articles A1 into a centralized position clear of the side walls 74. This reduces friction of the articles and reduces the power required to drive the main conveyor 16.

When the slide conveyor 14 is substantially empty, the beam of a lower photocell unit PC–1 (FIG. 2) is restored, and the drive motors 42 and 56 for the main and stacking conveyors are de-energized.

Although a single slide conveyor has been shown as feeding articles to both the main conveyor 16 and to the stacking conveyor 18 and 20, it will be obvious that separate slide conveyors occupying the widths "$w$" and "$w_2$" can be provided, each of which receives the articles from a different input conveyor. Thus in the broadest aspect of the invention the system need not include a single slide conveyor for delivering articles to both the stacking and the main conveyors.

In many installations, such as in post office installations or the like, the main conveyor 16 may be 300 or more feet long. Since the present invention permits doubling the use factor of the main conveyor by storing articles thereon in layers, the system of the present invention significantly decreases the costs, in a multiple installation, of the main conveyors 16. The long main conveyors referred to are considerably more costly than a pair of stacking conveyors, so that the system of the present invention, which doubles the use factor of each main conveyor, represents an appreciable economic saving.

In the appended drawings, the layer of articles delivered by the slide conveyor 14 is but one article deep, as is the layer delivered by each stacking conveyor 18, 20. Actually, each of these "layers" can be made of sub-layers of articles of lesser height. The ratio of the depth of the layer on the main conveyor to that on the slide conveyor "layers" equals the ratio of the projected widths, as follows:

$$\frac{2w2+w}{w}$$

If the stacking conveyors are fed independently, as described, the above ratio is not determinative of the depth of the layer on the main conveyor.

Having completed a detailed description of the invention, so that those skilled in the art may practice the same, I claim:

1. A two layer article conveying system comprising an endless generally horizontal main conveyor, an endless stacking conveyor running along each side of said main conveyor, each stacking conveyor having an article receiving portion adjacent its lower end with the stacking conveyor extending upwardly from its article receiving portion to a delivery end portion, said delivery end portion being spaced above said main conveyor so that the laterally inner edge of the stacking conveyor is spaced above said main conveyor by at least the average height of the article, being conveyed, each stacking conveyor being laterally inclined downwardly toward said main conveyor, the angle of inclination of each stacking conveyor exceeding the dynamic angle of repose of articles on the stacking conveyor for delivering a layer of articles on top of a layer of articles previously delivered to said main conveyor, means for delivering articles to said main conveyor and to each stacking conveyor, and means for driving said storage and stacking conveyors.

2. The system of claim 1 wherein said main conveyor is substantially twice as wide as each stacking conveyor.

3. The system of claim 1 wherein said stacking conveyors are driven at a linear speed different from that of said main conveyor.

4. The system of claim 1 wherein said stacking conveyors are driven at a linear speed that is higher than that of said main conveyor.

5. The system of claim 1 wherein vertical sidewalls extend along said main conveyor downstream of said stacking conveyors, each side wall merging with an article deflecting sidewall portion that extends from the laterally outer edge of the associated stacking conveyor.

6. The system of claim 5 wherein a lateral deflector for the upper layer of articles on said main conveyor projects from each main conveyor sidewall, said deflectors being offset lengthwise of the main conveyor.

7. A two layer article conveying system comprising a downwardly sloping fixed slide conveyor, an endless main conveyor extending generally horizontally from the midsection of the lower end of said slide conveyor, said main conveyor having substantially half the effective width of said slide conveyor, an endless stacking conveyor running along each side of said main conveyor, each stacking conveyor having an article receiving portion running past the lower end of said slide conveyor with the stacking conveyor extending upwardly from its article receiving portion to a delivery end portion, said delivery end portion being spaced above said main conveyor so that the laterally inner edge of the stacking conveyor is spaced above said main conveyor by at least the average height of articles being conveyed, each stacking conveyor being laterally inclined downwardly toward said main conveyor, the angle of inclination of each stacking conveyor exceeding the dynamic angle of repose of articles on the stacking conveyor for delivering a layer of articles on top of a layer of articles delivered directly to said main conveyor by said slide conveyor, each side portion of the delivery end of said slide conveyor being bevelled back to parallelism with the upper reach of the associated stacking conveyor, and means for driving said main and stacking conveyors.

8. The system of claim 7 wherein said stacking conveyors are driven at a linear speed higher than that of said main conveyor.

9. A two layer article storage and conveying system comprising an article input conveyor, a fixed slide conveyor sloping downwardly from one side of said input conveyor, means for transferring articles from said input to said slide conveyor, and endless main storage conveyor extending generally horizontally from the midsection of the lower end of said slide conveyor, said main conveyor having substantially half the effective width of said slide conveyor, an endless stacking conveyor running along each side of said main conveyor, each stacking conveyor having an article receiving portion running past the lower end of said slide conveyor with the stacking conveyor extending upwardly from its article receiving portion to a delivery end portion, said delivery end portion being spaced above said main conveyor so that the laterally inner edge of the stacking conveyor is spaced above said stack conveyor by at least the average height of articles being conveyed each stacking conveyor being laterally inclined downwardly toward said main conveyor, the angle of inclination of each stacking conveyor exceeding the dynamic angle of repose of articles on the stacking conveyor for delivering a layer of articles on top of a layer of articles delivered directly to said main conveyor by said slide conveyor, and means for driving said main and stacking conveyors.

References Cited by the Examiner

FOREIGN PATENTS 801,564   9/58   Great Britain.

SAMUEL F. COLEMAN, *Acting Primary Examiner.*

WILLIAM B. LA BORDE, *Examiner.*